(12) United States Patent
Brown

(10) Patent No.: US 10,593,168 B2
(45) Date of Patent: Mar. 17, 2020

(54) ELECTRIC FENCE INSULATOR WITH A LIGHT

(71) Applicant: William A. Brown, Akron, IA (US)

(72) Inventor: William A. Brown, Akron, IA (US)

( * ) Notice: Subject to any disclaimer, the term of this patent is extended or adjusted under 35 U.S.C. 154(b) by 186 days.

(21) Appl. No.: 15/910,581

(22) Filed: Mar. 2, 2018

(65) Prior Publication Data

US 2018/0253949 A1    Sep. 6, 2018

Related U.S. Application Data

(60) Provisional application No. 62/466,427, filed on Mar. 3, 2017.

(51) Int. Cl.
| | | |
|---|---|---|
| *G08B 7/06* | (2006.01) |
| *A01K 3/00* | (2006.01) |
| *A01M 29/24* | (2011.01) |
| *H01B 17/14* | (2006.01) |
| *A01M 29/10* | (2011.01) |
| *A01M 29/30* | (2011.01) |
| *A01M 29/16* | (2011.01) |
| *G08B 3/10* | (2006.01) |
| *G08B 5/36* | (2006.01) |
| *G08B 9/00* | (2006.01) |

(52) U.S. Cl.
CPC ............... *G08B 7/06* (2013.01); *A01K 3/005* (2013.01); *A01M 29/10* (2013.01); *A01M 29/16* (2013.01); *A01M 29/24* (2013.01); *A01M 29/30* (2013.01); *G08B 3/10* (2013.01); *G08B 5/36* (2013.01); *H01B 17/145* (2013.01); *G08B 9/00* (2013.01)

(58) Field of Classification Search
CPC . G08B 5/36; G08B 7/06; A01K 3/005; H05C 1/04; A01M 29/06; A01M 29/10

USPC ................. 119/502; 174/158 F; 340/654
See application file for complete search history.

(56) References Cited

U.S. PATENT DOCUMENTS

| | | | | |
|---|---|---|---|---|
| 4,061,873 A | | 12/1977 | Berg, Jr. et al. | |
| 4,171,523 A | * | 10/1979 | Parkitny | G08B 5/36 174/139 |
| 4,259,545 A | * | 3/1981 | Hayden | H01B 17/20 174/139 |

(Continued)

FOREIGN PATENT DOCUMENTS

| | | |
|---|---|---|
| WO | 2004095894 A1 | 11/2004 |
| WO | 2009028966 A1 | 3/2009 |

OTHER PUBLICATIONS

"The International Search Report and Written Opinion of the International Searching Authority", in connection to PCT/US2018/020845 filed Mar. 5, 2018 dated Jun. 22, 2018.

*Primary Examiner* — Yvonne R Abbott-Lewis
(74) *Attorney, Agent, or Firm* — McKee, Voorhees & Sease, PLC

(57) ABSTRACT

An insulator for notifying an animal when an electric fence is provided. The insulator may include a clip for attaching the insulator to the fence. Metal contact points may draw power from the electric fence when the fence is active, or the insulator may be powered through induction. The insulator may also include a circuit board or controller that receives power from the fence and translates it into an output directed to a notification device. The notification device may comprise a light that produces a visual notification or a speaker that produces an audible notification.

20 Claims, 10 Drawing Sheets

(56) References Cited

U.S. PATENT DOCUMENTS

| | | | | |
|---|---|---|---|---|
| 4,725,825 A | * | 2/1988 | McKean | G08B 5/36 256/10 |
| 5,338,226 A | | 8/1994 | Bryce et al. | |
| 2002/0003195 A1 | | 1/2002 | McDowell | |
| 2013/0222991 A1 | | 8/2013 | McWilliams | |
| 2016/0042843 A1 | | 2/2016 | Richard | |

* cited by examiner

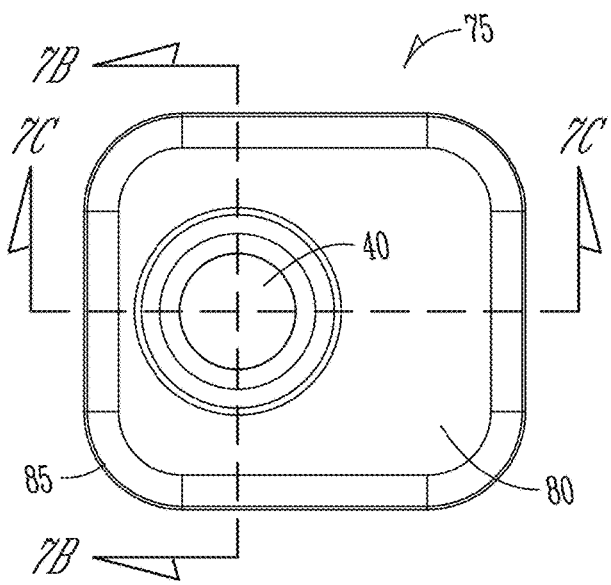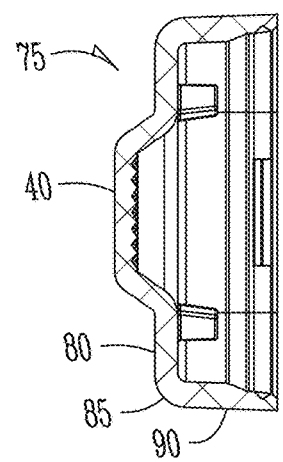
Fig. 7A
Fig. 7B
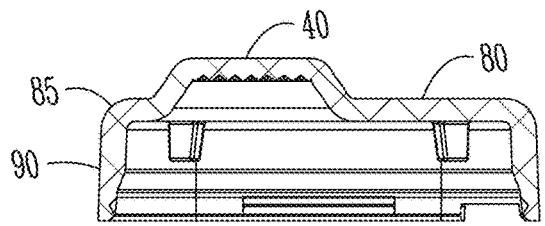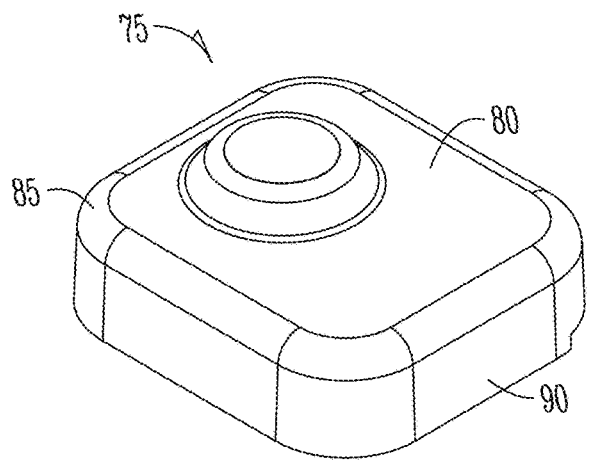
Fig. 7C
Fig. 7D

ELECTRIC FENCE INSULATOR WITH A LIGHT

FIELD OF THE INVENTION

The invention relates generally to an electric insulator. More specifically, but not exclusively, the invention relates to an electrical insulator with a light for use with an electric fence.

BACKGROUND OF THE INVENTION

Electric fences are commonly used to confine animals to a defined space or to prevent animals from entering a particular area. For example, an electric fence may be utilized to pen horses or cattle to a defined area while they graze. Alternatively, an electric fence may be utilized to prevent or deter rabbits or deer from entering a garden and eating the plants and vegetables.

An electric fence will generally include an energizer or similar power source to apply a voltage to the fence-line. The fence-line may be a wire or similarly conductive strap that is attached to a plurality of fence posts by an insulator. The energizer may be apply a continuous or pulse-like voltage to the fence. If an animal comes into contact with the fence while it is energized, they will receive a shock. This deters a confined animal from trying to exit or enter the area encircled by the electric fence. However, it is not always clear when the fence-line is active and carrying voltage, and when the fence-line is inactive and safe to touch. Therefore, there remains a need in the art for a device or apparatus that provides a notification to animals when the fence is active, and when it is safe to touch.

BRIEF SUMMARY OF THE INVENTION

Therefore, it is a primary object, feature, or advantage of the invention to improve on or overcome the deficiencies in the art.

It is another object, feature or advantage of the invention to provide a device that notifies animals when an electric fence is active and when it is inactive.

It is another object, feature or advantage of the invention to provide a device that includes an electric fence insulator that attaches to steel posts, t-posts, and wooden posts.

It is another object, feature or advantage of the invention to provide a device that includes a texting feature with modem capability that will text the end user if the voltage drops below levels required for viable electric fence use.

It is another object, feature or advantage of the invention to provide a device that will record and text the amount of voltage of the individual invention pieces indicating loss of voltage.

It is another object, feature, or advantage of the invention to provide a device that is capable of pinpointing the location of an electric fence failure.

It is another object, feature or advantage of the invention to provide a device that will measure and record amounts of rain fall.

It is another object, feature or advantage of the invention to provide a device that monitors and records, through texting, the temperature at each location of each device.

It is another object, feature or advantage of the invention to provide a device that monitors and records the dust particles in the air at each location of each device and indicates the level of soil erosion.

It is another object, feature or advantage of the invention to provide a device that measures and communicates the barometric pressure at each location of each device indicating pressure changes for future weather changes.

It is another object, feature, or advantage of the invention to provide a device that is durable.

It is another object, feature, or advantage of the invention to provide a device that is easily installed and removed.

It is another object, feature, or advantage of the invention to provide a device that can be seen easily by humans and livestock during the day and at night.

It is another object, feature, or advantage of the invention to provide a device that improves the safety of humans and livestock.

It is another object, feature, or advantage of the invention to provide a device that is cost effective.

These or other objects, features, and advantages of the invention will be apparent to those skilled in the art. The invention is not to be limited to or by these objects, features and advantages. No single embodiment need provide each and every object, feature, or advantage.

According to aspects of the present disclosure, an insulator is provided that includes a means for notifying an animal when the electric fence is active or inactive. The means for notifying the animal or individual that the line is active may include a visual marker, such as a light, or an audible marker, such as a microphone or speaker. The insulator also includes a means for attaching the insulator to the fence-line of the electric fence. The means for attaching the insulator may be a clip or a hook, and may include contact members configured to collect power from the electric fence while the electric fence is active. The insulator also includes a means for operatively attaching the insulator to the electric fence. The means for operatively attaching the insulator to the electric fence may be a clip or a strap. The insulator also includes a circuit board embedded in the insulator. The circuit board may be configured to receive power from the contact members and may convert the power into an output for the means for notifying an animal. The insulator may be incorporated into a system that includes the insulator and the electric fence having a fence post. The system may then be incorporated into a method for preventing injury to animals or preventing damage to private property comprising providing the system and notifying an animal when the electric fence is active or inactive, thereby warning the animal of the location of the electric fence.

According to other aspects of the present disclosure, an insulator for an electric fence comprises a circuit board embedded within the insulator, a light or speaker attached to a front portion of the circuit board, a hook or a first clip attached to the front portion of the circuit board, and a strap or a second clip attached to the rear portion of the circuit board. The hook or the first clip is operatively attached to the wiring of the electric fence, said wiring being removably secured to the insulator, the hook or the first clip including an aperture in an extended arm of the hook or the first clip and contact points configured to collect power from the electric fence while the electric fence is active. The strap or the second clip is removably secured to the insulator and has an aperture for securing the member to a fence post of the electric fence and tracks or slots. The hook or the first clip may be circularly shaped, and the contact points may encircle an interior surface of the hook or the first clip to provide improved contact between the wiring and the contact points. Alternatively, the hook or the first clip may be elongated and configured to press the wiring against the contact points when the clip is secured to the wiring. The hook or first clip may be configured to move between an open position and a closed position. A small battery embedded in the insulator and configured to receive and store a small amount of the voltage/power received by the insulator when the electric fence is active may be included. The rear portion of the circuit board may include one or more pins extending outward, said pins having an enlarged head and configured to ground the insulator to the fence post, and the tracks or slots of the strap or the second clip may include an enlarged end opening and a narrow body portion, said enlarged end configured to receive the enlarged head of the pins on the circuit board. The insulator may also include an enclosure within which the wiring contacts the contact points.

Other aspects of the invention will be apparent to those skilled in the art from the following detailed description of the illustrated embodiments, accompanied by the attached drawings wherein identical reference numerals will be used for like parts in the various views.

BRIEF DESCRIPTION OF THE DRAWINGS

FIG. 5A is a top view; FIG. 5B is a perspective view; FIG. 5C is a front view; and FIG. 5D is a side view.

FIGS. 7A-7D are various views of a cover of the enclosure shown in FIG. 6. FIG. 7A is a front view; FIG. 7B is a side-sectional view taken along line 7B-7B; FIG. 7C is a bottom-sectional view taken along line 7C-7C; and FIG. 7D is a perspective view.

FIG. 8A is a front view; FIG. 8B is a side-sectional view taken along line 8B-8B; FIG. 8C is a bottom view; and FIG. 8D is a perspective view.

Figure 1:
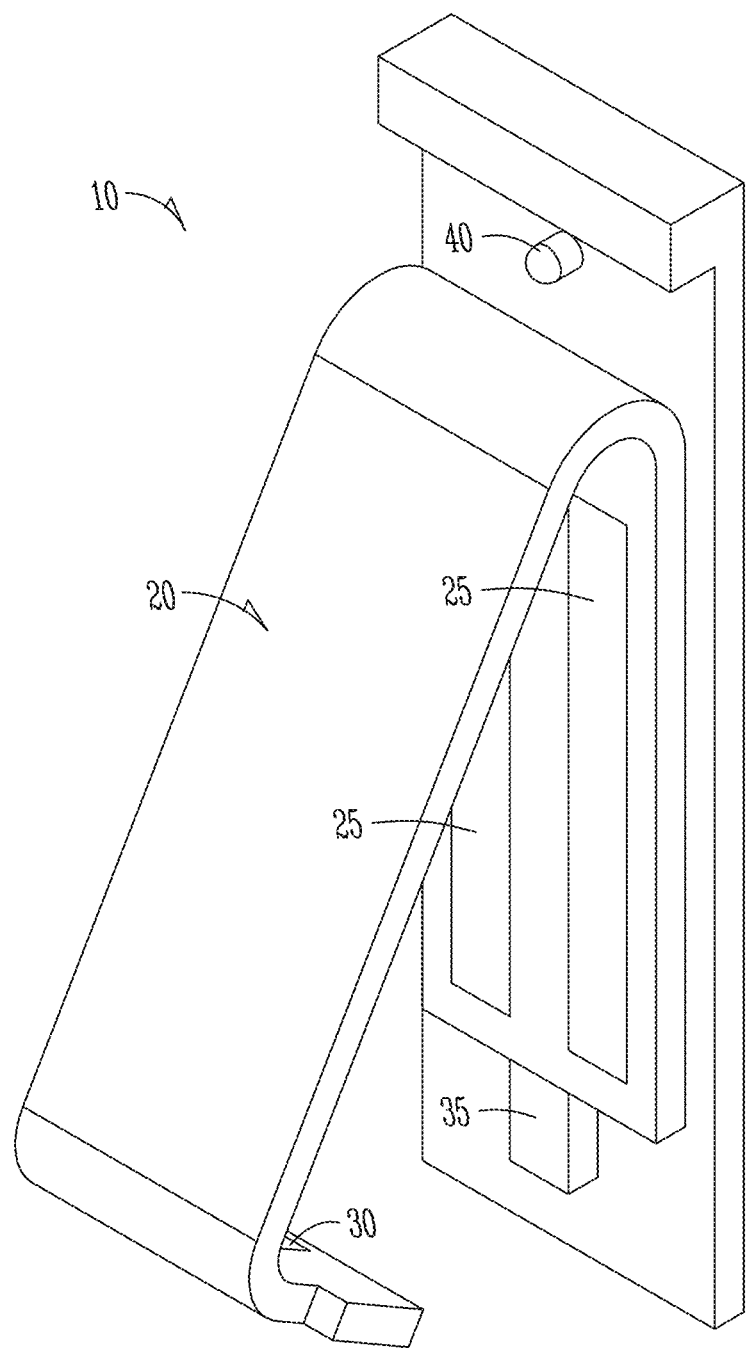
FIG. 1 is a perspective view of an example embodiment of an insulator for an electric fence including a light.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The following definitions and introductory matters are provided to facilitate an understanding of the present disclosure, including the claimed subject matter contained therein.

The singular terms "a," "an," and "the" include plural referents unless context clearly indicates otherwise. Similarly, the term "or" is intended to include "and" unless the context clearly indicate otherwise. The term "or" means any one member of a particular list and also includes any combination of members of that list (i.e. the term "or" is non-exclusive).

Reference is made to the accompanying drawings which form a part hereof, and in which is shown by way of illustration specific embodiments in which the invention may be practiced. These embodiments of the invention will be described in detail with reference to the drawings, wherein like reference numerals represent like parts throughout the several views. These embodiments are described in sufficient detail to enable those skilled in the art to practice the invention, and it is to be understood that other embodiments may be utilized and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, rear, end, sides, and the like, are referenced according to the views presented. It should be understood, however, that the terms are used only for purposes of description, and are not intended to be used as limitations. Accordingly, orientation of an object or a combination of objects may change without departing from the scope of the invention.

Finally, for purposes of the present disclosure, the term "animal" is defined as a living organism that feeds on organic matter, typically having specialized sense organs and nervous system and able to respond rapidly to stimuli. The term "animal" is intended to encompass all living organisms that fall within the biological kingdom Animalia, non-limiting examples of which include humans (e.g. farmers, ranchers, trespassers, etc.), livestock, and "wild animals."

The present disclosure is directed towards a system, method, and apparatus for providing notification to an animal or individual when an electric fence is active (also referred to as hot, live, charged, energized, etc.).

Referring to FIG. 1, a perspective view of an example embodiment of the insulator 10 is shown. The insulator includes a circuit board or control unit. The circuit board is made up of conventional circuit board components but is at least capable of operating in conditions where the ambient temperature is between 0 and 120 degrees Fahrenheit and the relative humidity is between 0 and 90%. The circuit board may be configured to translate the voltage received from an active fence-line 55 into an audible or visual notification to alert an animal or individual when the fence-line 55 is active. For example, the insulator 10 may include a notification device 40 such as a light or microphone.

According to some aspects of the present disclosure, the light may be an LED light, and the circuit board may be configured to receive the voltage traveling along the fence-line 55 when it is active and convert it to a signal to power the light on. This will alert an animal when the line 55 is active so that they know to avoid contact with the line 55. The circuit board may also be configured to have the light flash or blink. The flashing pattern of the light may be configured to produce a pattern representative of a message in Morse code.

Alternatively, the insulator 10 may also be configured to include a speaker. The speaker may be the only notification device 40 included as part of the insulator 10, or the speaker may be in addition to the light described above. Similar to the light described above, the speaker may be configured to produce an audible sound when the fence-line 55 is active. For example, the fence-line 55 may be charged, and the circuit board will receive a voltage from the fence-line 55 and convert that to power the speaker to emit an audible signal to alert individuals that the line 55 is active. The circuit board may be configured to produce a single sound of any duration, or the circuit board may be configured to emit a pulsing sound. The pulsing sound may be configured in a pattern representative of a message in Morse code.

According to other aspects of the disclosure, the insulator 10 may include any of the following features: a texting feature with modem capability that will text the end user if the voltage drops below levels required for viable electric fence use; the capability to record and text the amount of voltage of the individual invention pieces indicating loss of voltage; the capability to pinpoint the location of an electric fence failure; a measuring feature that measures and records amounts of rain fall; a monitoring feature that monitors and records the temperature at each location of each inductor; a monitoring feature that monitors and records the dust particles in the air at each location of each inductor and indicates the level of soil erosion; a measuring feature that measures and communicates the barometric pressure at each location of each inductor indicating pressure changes for future weather changes. These features or capabilities may be implemented, if necessary, through the addition of a suitable hardware component connected to a controller 16 of the circuit board 15, such as cellular transceiver, sensor, or any other electrical components known to perform the previously mentioned features or capabilities. Additionally, the controller 16 may be programmed such that the controller 16 performs each feature or capability more efficiently.

The insulator 10 may also include a clip 20 or means for attaching the insulator 10 to the fence-line. The clip 20 may be any type of hook, loop, clip, snap, or similar brace configured to receive and secure the various type of fence-line or wiring 55 utilized in an electric fence system. Furthermore, the clip may be generally constructed of a material intended for use as an electrical insulator, such as a plastic polymer or rubber. As shown, in FIGS. 1-2 and 4, the clip 20 is attached to a front portion of the circuit board. The clip may be constructed of a flexible/pliable material, such as a plastic polymer or metal alloy. The material should be sufficiently durable to withstand the force applied to the clip 20 when a fence-line 55 is secured and tightened. As shown in FIG. 1, the clip 20 includes a means for removably securing the fence-line 55 to the clip 20 in the form of an aperture 30 in an extended arm of the clip 20 configured to receive a nub or pin 35 located on the bottom of a rear portion of the clip 20 or other means for securing the clip 20.

Figure 4:
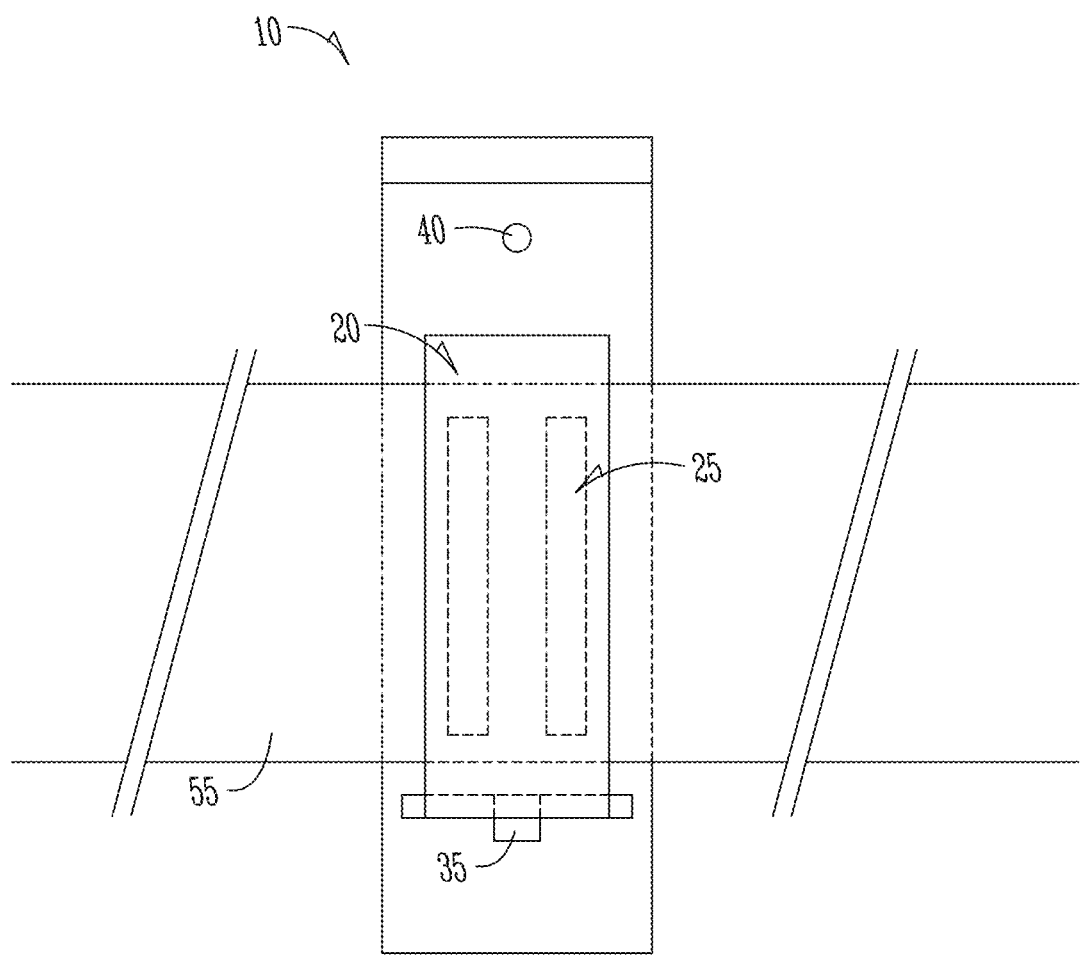
FIG. 4 is a front view of the insulator of FIG. 1 attached to the fence-line of an electric fence.
Figure 5A:
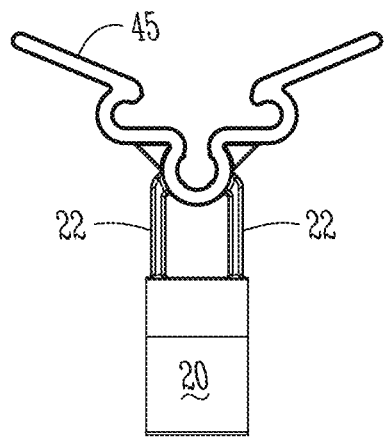
FIGS. 5A-5D are various views of an alternative embodiment of the insulator of an insulator for an electric fence including a light.
Figure 5B:
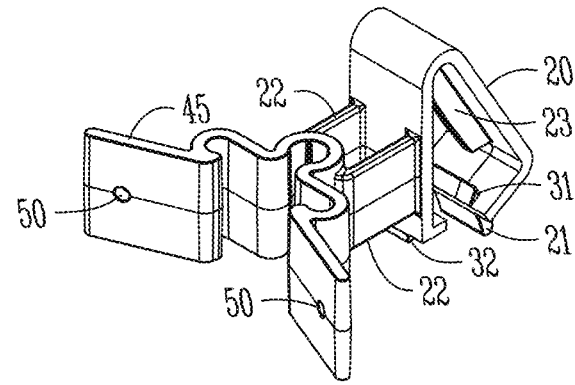
Figure 5C:
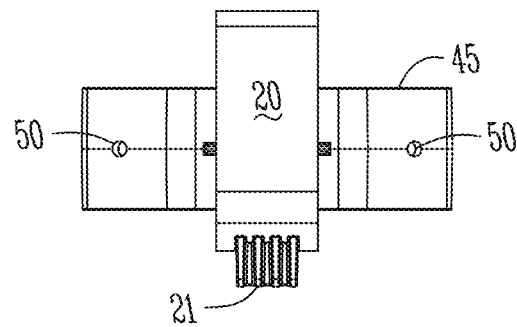
Figure 5D:
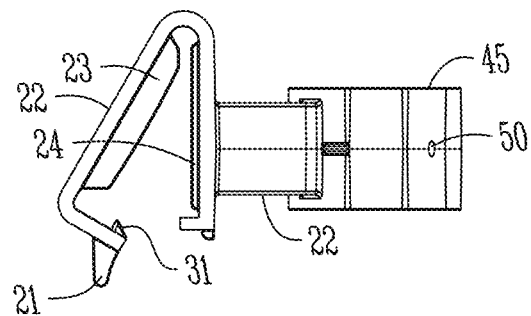

The rear portion of the clip 20 may further include contact points 25 for the electric fence. The contact points 25 may be configured to receive the voltage passing through the fence-line 55 and transfer it to the circuit board for powering the notification device 40. The size and shape of the clip 20 and contact points 25 may be configured to optimize the contact points 25 interaction with the fence-line 55. For example, for a round wire based electric fence-line 55, the clip may be configured in a circular shape and the contact points may encircle the interior surface of the circular clip 20 to provide improved contact between the wire 55 and the contact points 25. Alternatively, if a flat band-like fence-line 55 is utilized (as shown in FIG. 4), the clip 20 may be elongated and configured to press the band-like fence-line 55 against the contact points when the clip 20 is secured to the fence-line 55. One of the contact points may also be utilized to ground the insulator 10 to the fence-post. A small battery 18 (not shown) may also be embedded in the insulator and configured to receive and store a small amount of the voltage/power received by the insulator 10 when the fence is active. The battery 18 typically has a battery life of at least one year.

Figure 2:
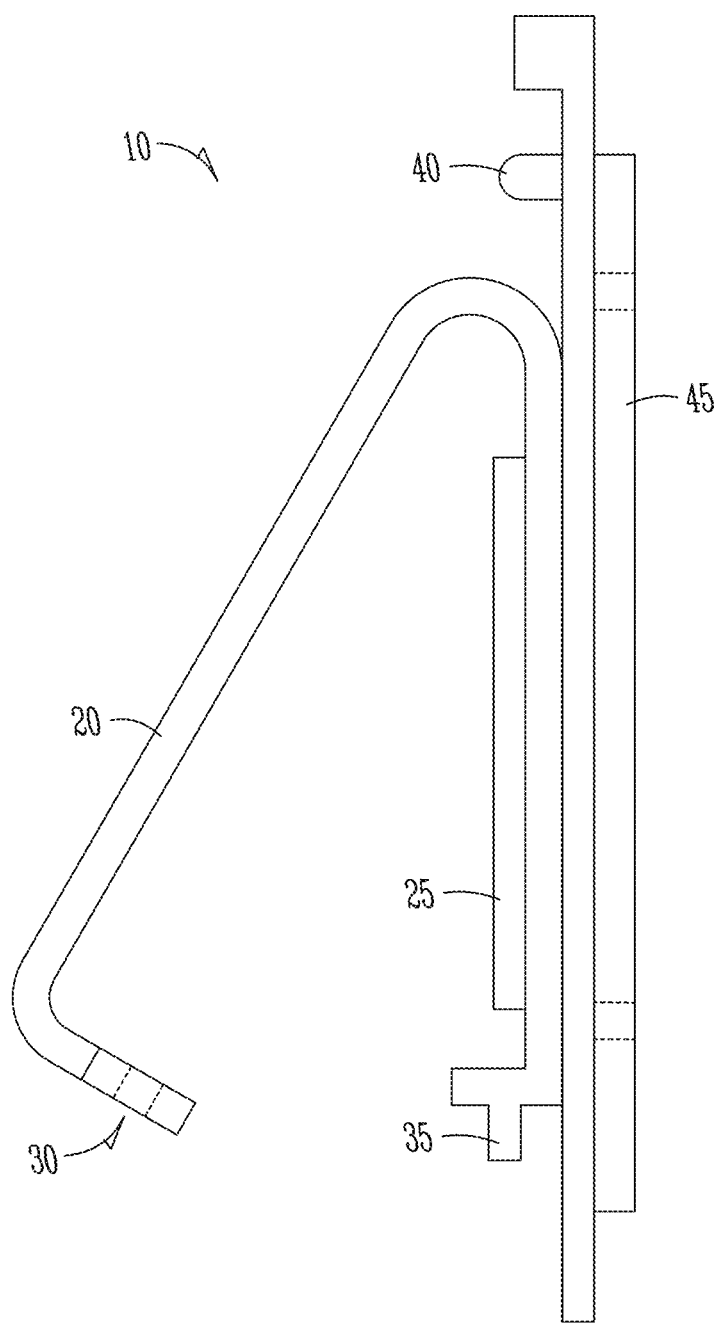
FIG. 2 is a side view of the insulator of FIG. 1.

Referring to FIG. 2, a side view of an example embodiment of the insulator 10 is shown with the clip 20 in an open position. Furthermore, as shown in FIG. 2, an attachment member 45 is shown on the rear portion of the circuit board. The attachment member 45 may be configured to secure the insulator 10 to a fence post or similar support structure. The attachment member 45 may include one or more apertures 50 for securing the attachment member 45 to the post. The attachment member 45 may also include tracks, slots, clips, or elongated apertures configured to removably connect the circuit board to the attachment member 45. For example, the rear portion of the circuit board may include one or more pins extending outward that include an enlarged head. The attachment member 45 may include one or more slots with an enlarged end opening and a narrow body portion of the slot(s), wherein the enlarged end is configured to receive the enlarged head of the pins on the circuit board. The pins on the circuit board may then be slid along the track of the attachment member 45 to secure the circuit board to the attachment member 45. While not described in detail, alternative configurations for attaching the circuit board to the attachment member 45 are contemplated. The pins on the back of the circuit board may also be configured to ground the insulator to the fence post.

Figure 3:
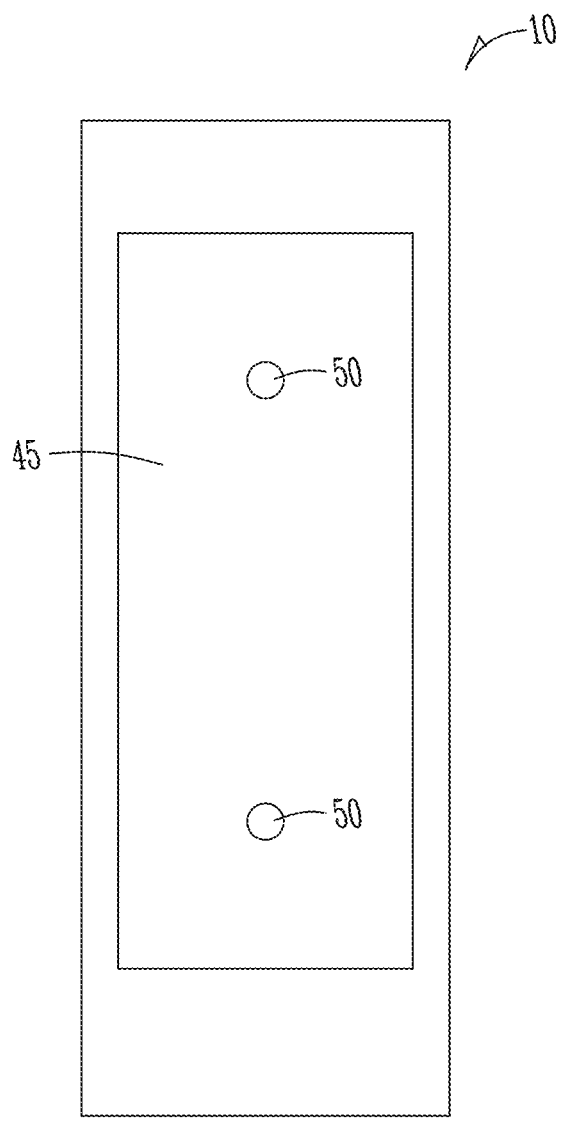
FIG. 3 is a rear view of the insulator of FIG. 1.

Referring to FIG. 3, a rear view of an example embodiment of the insulator 10 is shown with a more detailed view of an example embodiment of the attachment member 45. As shown, the member includes one or more apertures 50 for receiving a fastener, such as, a nail, screw, bolt, etc., for securing the attachment member 45 or insulator 10 to the fence post. It is also contemplated that the attachment member 45 may also be configured as a clip or strap configured to be wrapped around the fence post to secure the insulator to the post.

Referring to FIG. 4, an example embodiment of the insulator 10 connected to a fence-line 55 is shown. The fence-line 55 is secured to the insulator 10 via the clip 20. The clip includes contact points 25 on the interior surface(s) of the clip 20 configured to contact the fence-line 55. In operation, the electric fence may be activated and powered by an energizer configured to pass a voltage through the fence-line 55. The energizer may be configured to maintain a steady or constant voltage through the fence-line 55 when active, or it may be configured to send pulses and selected intervals through the fence-line 55. As voltage passes through the fence-line 55, the voltage will reach the insulator, wherein a small amount of power will be collected by the contact points and transferred directly to the circuit board or a battery. The circuit board will then translate the power received from the fence-line 55 into an output signal directed to the notification device 40. As described above, example notification devices 40 may include a light or a speaker. In one example, the circuit board may be configured to have a light blink to notify anyone near the fence that it is active. This may notify an animal that the fence is active. Alternatively, as an electric fence and non-electric fences may look similar in construction, the insulator described above may also be utilized to alert an animal who is otherwise unaware that the fence is an electric fence.

According to other aspects of the disclosure, as shown in FIGS. 5A-5D, the insulator 10 may include a circuit board which directly picks up pulses sent through the fence-line 55 through induction rather than utilizing contact points 25. Now included in insulator 10 are a releasing mechanism 21, support members 22 bridging the clip 20 and the attachment member 45, a first ridge or protrusion 23, and a second ridge or protrusion 24. The ridges 23, 24 help insulate the clip from heat produced by the fence-line 55. In the embodiment shown, the means for removably securing the fence-line 55 to the clip 20 is a retention member 32 configured to interlock an angled member 31. The angled member 31 is angled such that it slidably engages the retention member until pushed far enough such that the back wall of the angled member 31 catches the retention member 32, thereby interlocking the angled member 31 and the retention member 32. When interlocked, the clip 20 is in a closed position. A releasing mechanism 21 may be pushed (such as in the embodiment shown), pulled, or otherwise engaged in order to release the clip from the closed position into an open position where the angled member 31 is no longer interlocking the retention member 32.

Figure 6:
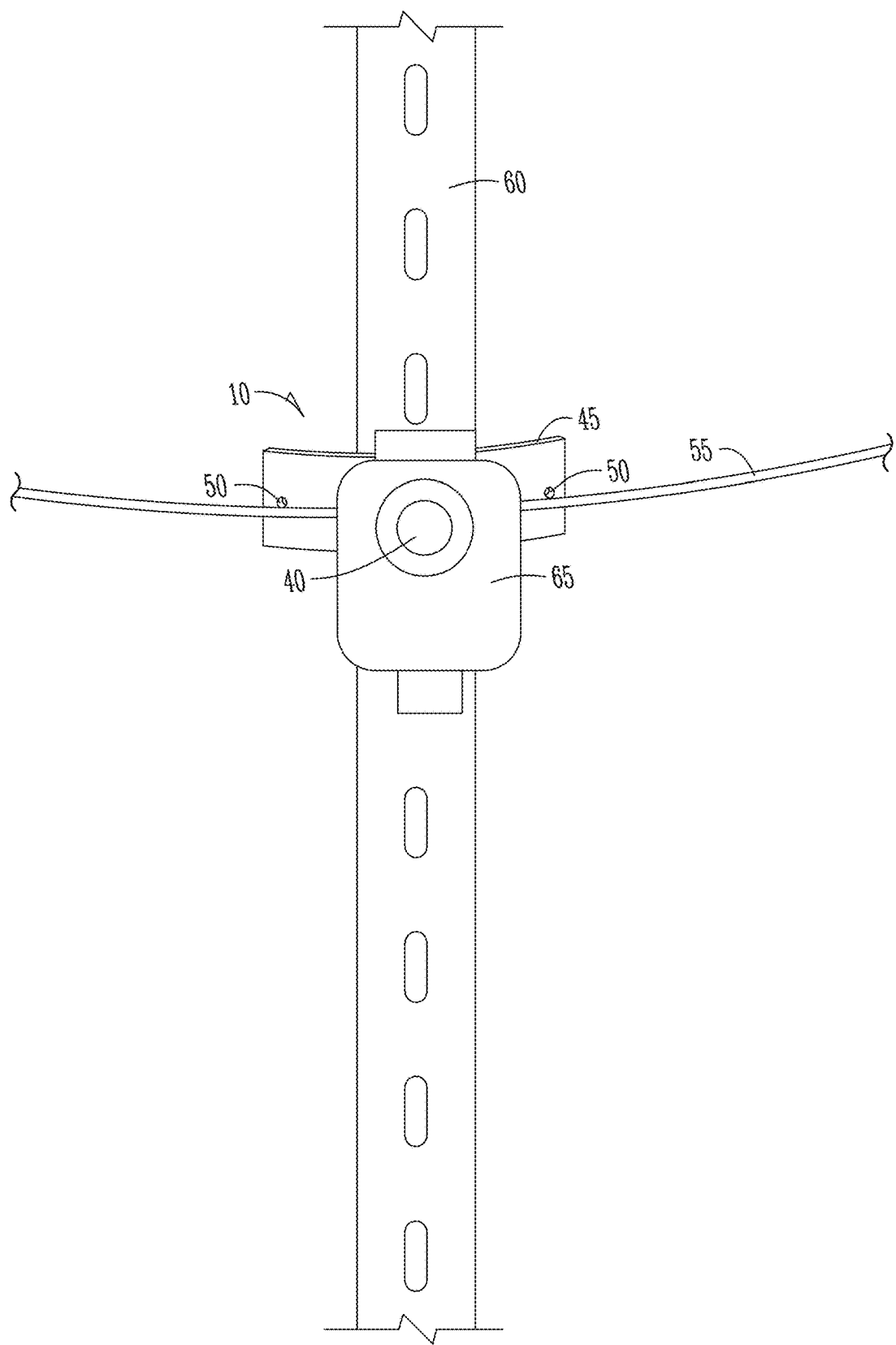
FIG. 6 is a perspective view of the insulator of FIG. 1 mounted to a post of an electric fence.
Figure 8A:
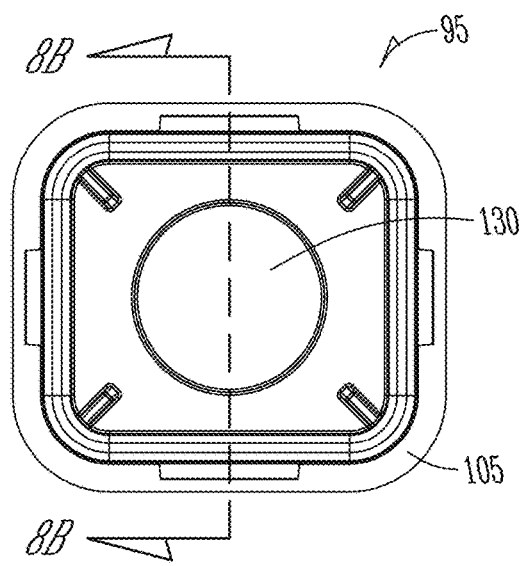
FIGS. 8A-8D are various views of a base of the enclosure shown in FIG. 6.
Figure 8B:
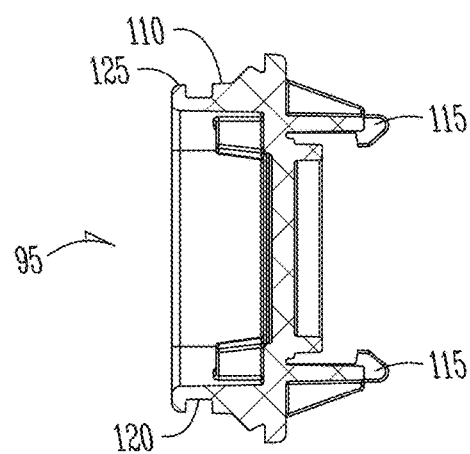
Figure 8C:
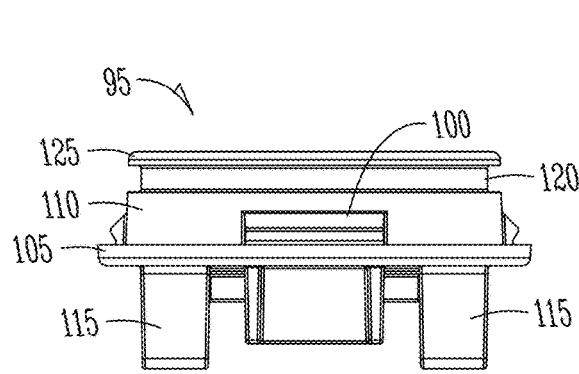
Figure 8D:
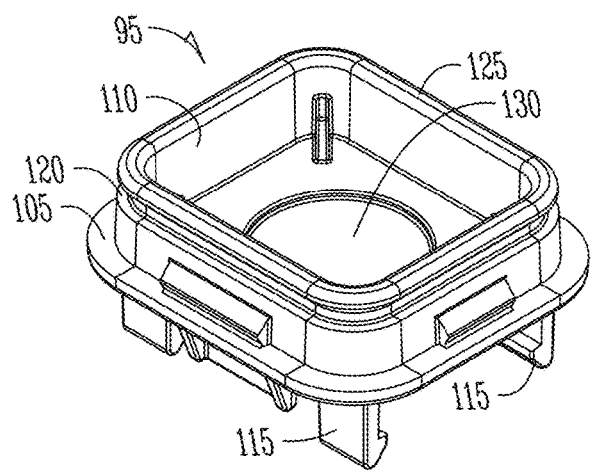

Referring to FIG. 6, the insulator 10 is attached to an electric fence post 60, including the standard t-post used in the normal electric fence used in livestock containment. The insulator 10 may have an enclosure 65 housing the circuit board in which the electric wire or the braided electric fence wire 55 will supply power to the circuit board via contacting the metal contact points 25 that are embedded in the insulator 10 or via induction. The electric circuit board (exemplified in FIGS. 9A and 9B) is constructed of conventional circuit board materials and may be attached to an LED light that lights up with surge of the electric current that is powered by an electric livestock fence. The current traveling through the wire 55 will light the LED light after passing through the insulator 10. Typically, the LED light will be activated when the voltage produced by the electric fence achieves a low threshold minimum of 4000V, and the LED light will deactivate when the voltage produced by the electric fence falls below 3000V.

FIGS. 7A-7D shows a cover 75 for the enclosure 65. The cover includes a front face 80, radial edge 85, and sidewall 90. The cover 75 may be transparent, may have an opening exposing the notification device 40, may include a special lens to increase visibility of the notification device 40, or may take any shape or configuration that otherwise aids in notifying an animal the electric fence is active. During operation of the insulator 10, the cover 75 is matingly secured to a base 95 of the enclosure 65 via tabs 100, said base 95 illustrated in FIGS. 8A-8D. The base 95 may be opaque to increase visibility of the notification device 40 and may take any shape or configuration that aids in notifying an animal the electric fence is active. Also included in base 95 of the enclosure 65 is a protruding edge 105, sidewall 110, legs 115, recess 120, lip 125, and hole 130.

The insulator 10 described in FIGS. 1-8 has countless applications where it may be adapted to prevent injury to animals, including humans. Some examples of various uses for the insulator 10 include: preventing deer from entering orchards and private property and damaging trees (deer will avoid a red flashing light thinking it is a predator); preventing deer from running through livestock fencing; serving as an early warning to the malfunction of an electric fence for ranchers and livestock owners; serving as a warning to the location of electric fencing; and allowing animals to see or hear the fence-line at night such that the animals do not accidentally contact it.

Figure 9A:
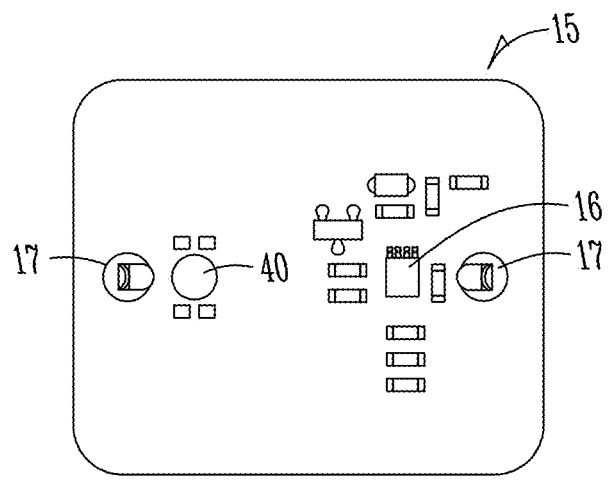
FIGS. 9A shows an exemplary circuit board.
Figure 9B:
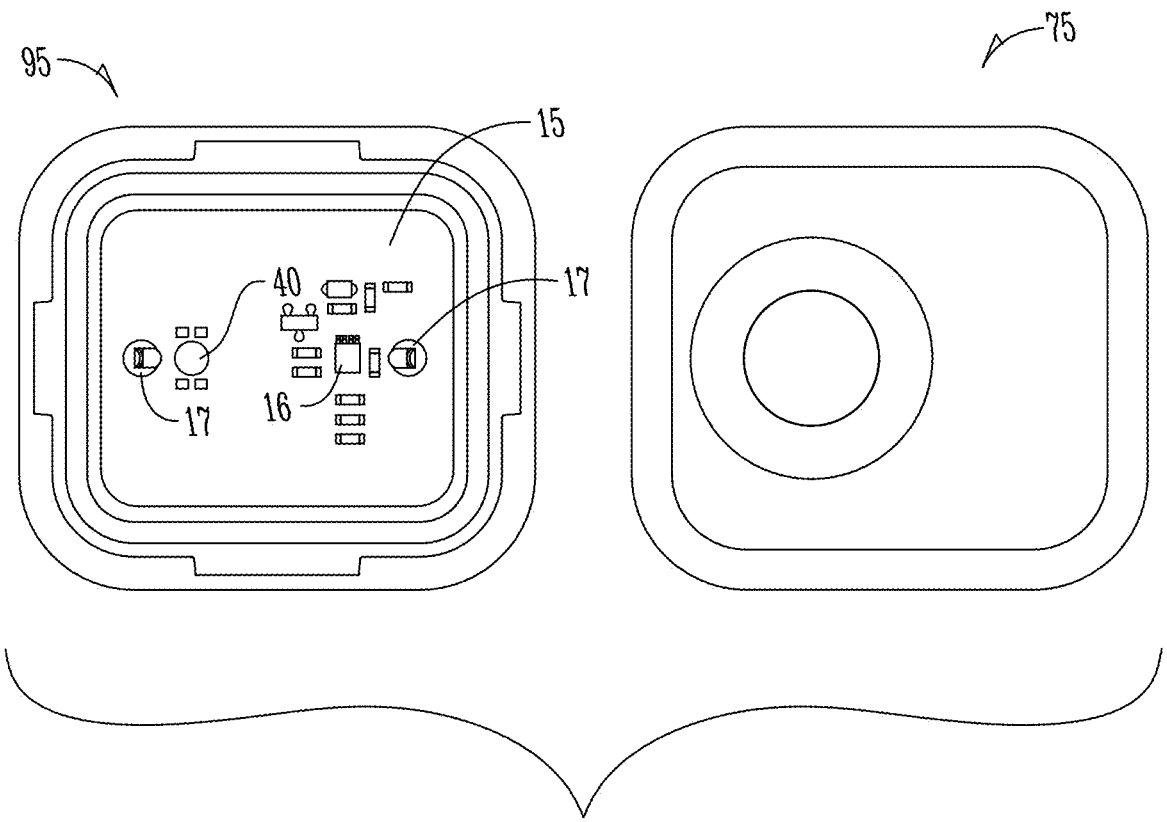
FIG. 9B shows the exemplary circuit board embedded inside the base of the enclosure alongside the cover.

FIG. 9A shows an exemplary circuit board 15 having a controller 16, battery mounts 17, and a battery 18 (not shown) mounted to the rear of the circuit board 15 via battery mounts 17. FIG. 9B shows the exemplary circuit board 15 embedded inside the base 95 of the enclosure 65.

Figure 10:
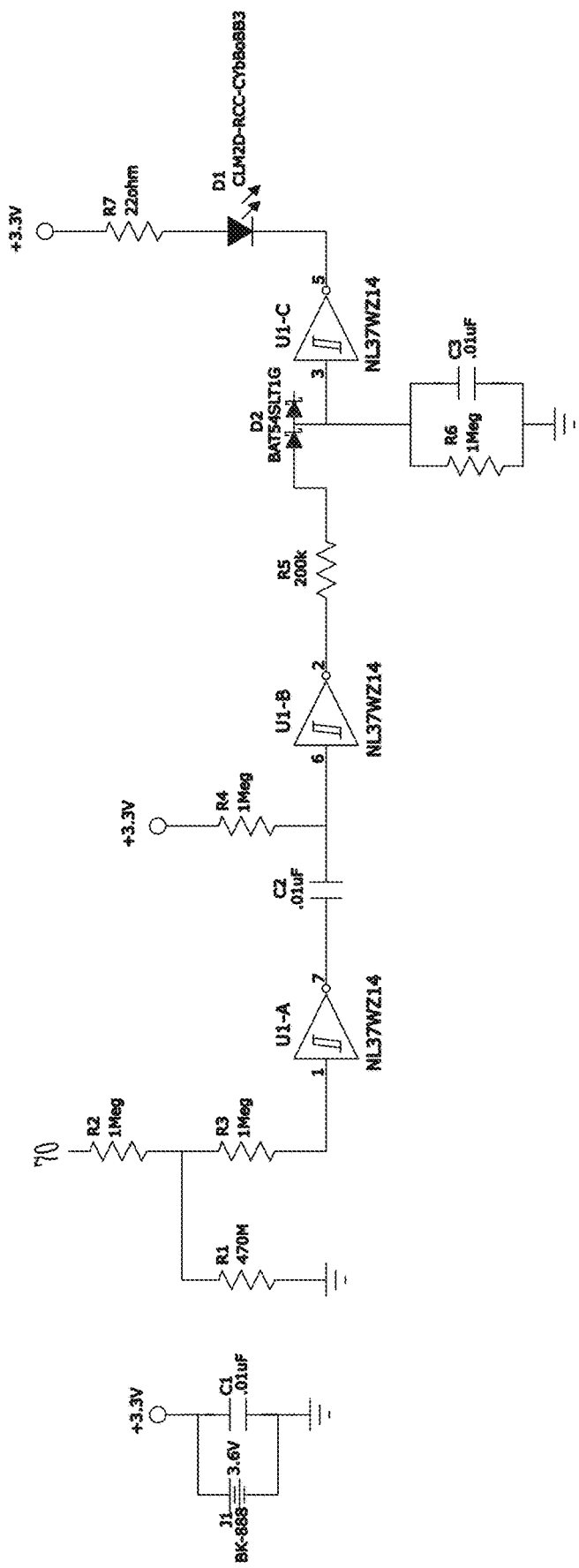
FIG. 10 is an electrical schematic showing the components of an exemplary light to be used in conjunction with the insulator of FIG. 1.

Referring to FIG. 10, the electrical components of an exemplary electrical fence light (serving as notification device 40) according to the electrical schematic shown. A connection point 70 exists right above R2 that connects the light to a copper strip around the perimeter of the circuit board 15 to act as an antenna.

U1-A, U1-B, and U1-C are inverters, and more specifically may be Schmitt-Trigger-Triple-US8 type inverters (a non-limiting example of which would be part NC7NZ04K8X manufactured by Fairchild). R1-R7 are fixed resistors with the resistance values denoted in the figure. More specifically, R1 may be a 470 Meg-1/16 W-5% type resistor (a non-limiting example of which would be part CRCW0603470MJPEAHR manufactured by Vishay); R2-R4 and R6 may be 1 Meg-1/10 W-1% type resistors (a non-limiting example of which would be part RMCF0603FT1M00 manufactured by Stackpole); R5 may be a 200 k-1/16W-1% 0603 type resistor (a non-limiting example of which would be part MCR03ERTF2003 manufactured by Rohm Semiconductor; and R7 may be a 22 ohm-1/10 W-1% 0603 type resistor (a non-limiting example of which would be part ERJ-3EKF22R0V manufactured by Panasonic). C1-C3 are non-polarized 0.01 µF capacitors (a non-limiting example of which would be part GRM188R71H103KA01D manufactured by Murata. D1 is an LED, and more specifically is a Red, PLCC4, 4500 mcd@20mA type LED (a non-limiting example of which would be part CLM2D-RCC-CYbBoBB3 or part CLM2D-RCC-CZ0B0BB3 manufactured by Cree). D2 is a pair of Schottky diodes, and more specifically are Schottky-70V-70 mA-Dual-Series-SOT23 type diodes (a non-limiting example of which would be part BAT54SLT1G manufactured by ON Semiconductor). Finally, J1 represents a multi cell battery, and more specifically represents a CR2032 Coin cell battery (a non-limiting example of which would be part CR2032 manufactured by Panasonic) with a CR2032 type coin cell retainer with PC pins (a non-limiting example of which would be part BK-888 manufactured by Memory Protection Devices).

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An insulator for an electric fence comprising:
 a means for notifying an animal when the electric fence is active or inactive;
 a means for mechanically attaching the insulator to the electric fence;
 a means for operatively attaching the insulator to the fence-line of the electric fence; and
 a circuit board embedded within the insulator.

2. The insulator of claim 1, wherein the means for notifying an animal is a light.

3. The insulator of claim 2, wherein the circuit board flashes or blinks the light when the fence is active.

4. The insulator of claim 2, wherein the light is an LED light configured to emit light in a number of different colors, and further wherein the circuit board is selects the color of the LED light in response to receiving an input.

5. The insulator of claim 1, wherein the means for notifying an animal is an audible marker.

6. The insulator of claim 5, wherein the audible marker emits a pulsing sound.

7. The insulator of claim 1, wherein the circuit board is configured to receive power through induction via electric pulses sent through the electric fence-line and convert the power into an output for the means for notifying an animal.

8. The insulator of claim 1, wherein the means for operatively attaching the insulator to the fence-line of the electric fence is a clip or hook.

9. The insulator of claim 8, wherein the clip or hook includes a means for removably securing the fence-line to the clip or hook.

10. The insulator of claim 9, wherein the means for removably securing the fence-line to the clip or hook is an aperture configured to receive a nub or pin of the clip or hook.

11. The insulator of claim 9, wherein the means for removably securing the fence-line to the clip or hook is a retention member configured to interlock an angled member.

12. The insulator of claim 9, wherein the means for removably securing the fence-line to the clip or hook includes a releasing mechanism to release the clip or hook from a closed position into an open position.

13. The insulator of claim 1, wherein the means for attaching the insulator to the electric fence is a strap.

14. A system for notifying an animal when the electric fence is active or inactive, comprising:
the insulator for an electric fence of claim 1; and
the electric fence having a fence post attached to the insulator.

15. A method for preventing injury to animals or for preventing damage to private property, comprising:
providing the system of claim 14; and
notifying an animal when the electric fence is active or inactive, thereby warning the animal of the location of the electric fence.

16. An insulator for an electric fence comprising:
a circuit board embedded within the insulator;
a light or speaker attached to a front portion of the circuit board;
a hook or a first clip attached to the front portion of the circuit board, operatively attached to the wiring of the electric fence, and removably secured to the insulator having:
an aperture in an extended arm of the hook or the first clip; and
contact points that collect power from the electric fence while the electric fence is active; and
a strap or a second clip attached to the rear portion of the circuit board and removably secured to the insulator having:
an aperture for securing the member to a fence post of the electric fence; and tracks or slots.

17. The insulator of claim 16, wherein the hook or the first clip is circularly shaped, and further wherein the contact points encircle an interior surface of the hook or the first clip to provide improved contact between the wiring and the contact points.

18. The insulator of claim 16, wherein the hook or the first clip is elongated and presses the wiring against the contact points when the clip is secured to the wiring.

19. The insulator of claim 16, further comprising a battery embedded in the insulator, said battery receiving and storing a small amount of the voltage/power received by the insulator when the electric fence is active.

20. The insulator of claim 16, wherein:
the rear portion of the circuit board includes one or more pins extending outward, said pins having an enlarged head and configured to ground the insulator to the fence post; and
the tracks or slots of the strap or the second clip include an enlarged end opening and a narrow body portion, said enlarged end configured to receive the enlarged head of the pins on the circuit board.

* * * * *